Nov. 13, 1962  R. T. FENN  3,063,131
INDEXING MACHINE TOOL
Filed Aug. 6, 1959  2 Sheets-Sheet 1
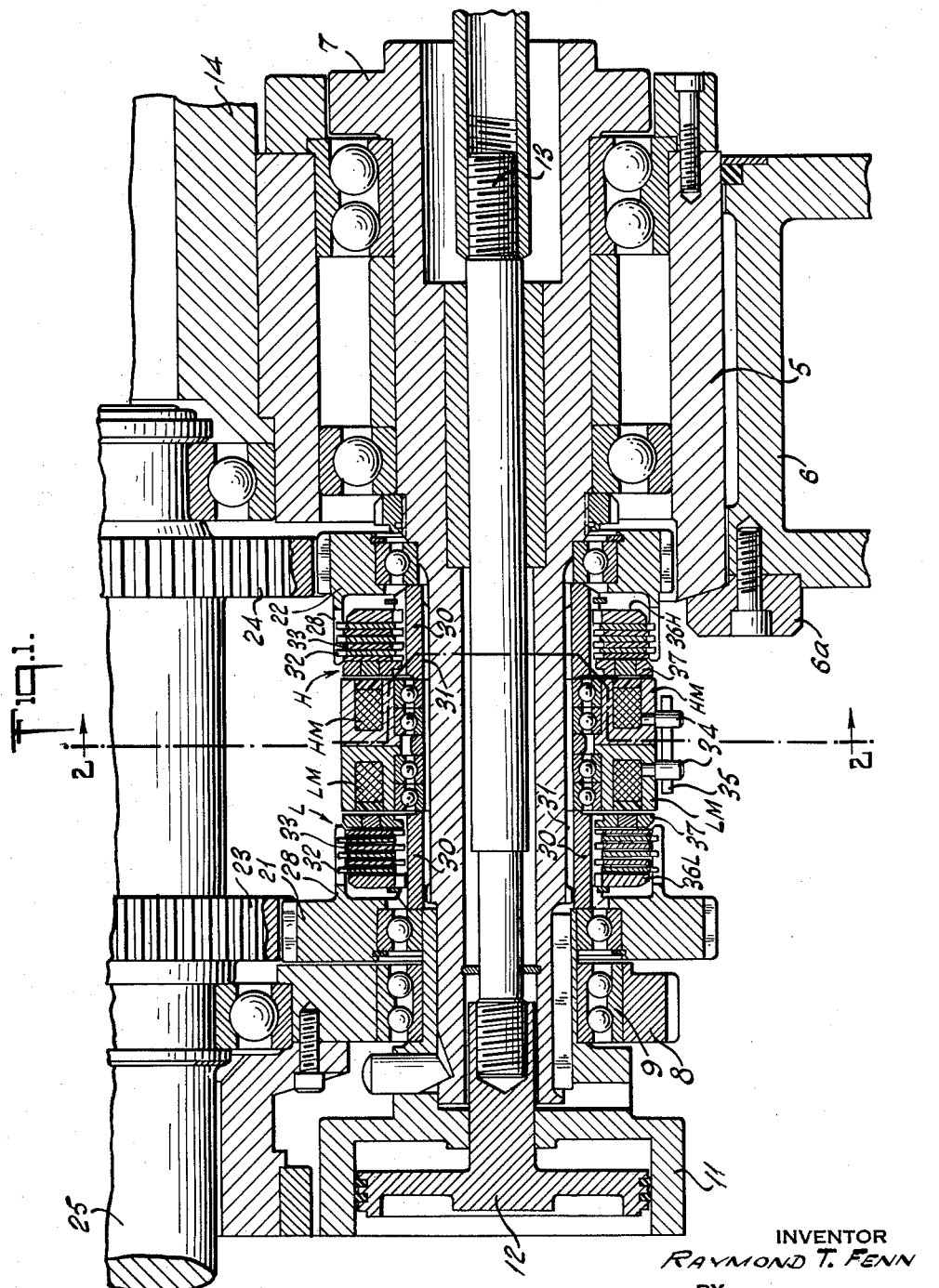
INVENTOR
RAYMOND T. FENN
BY
Mitchell T Bechert
ATTORNEYS

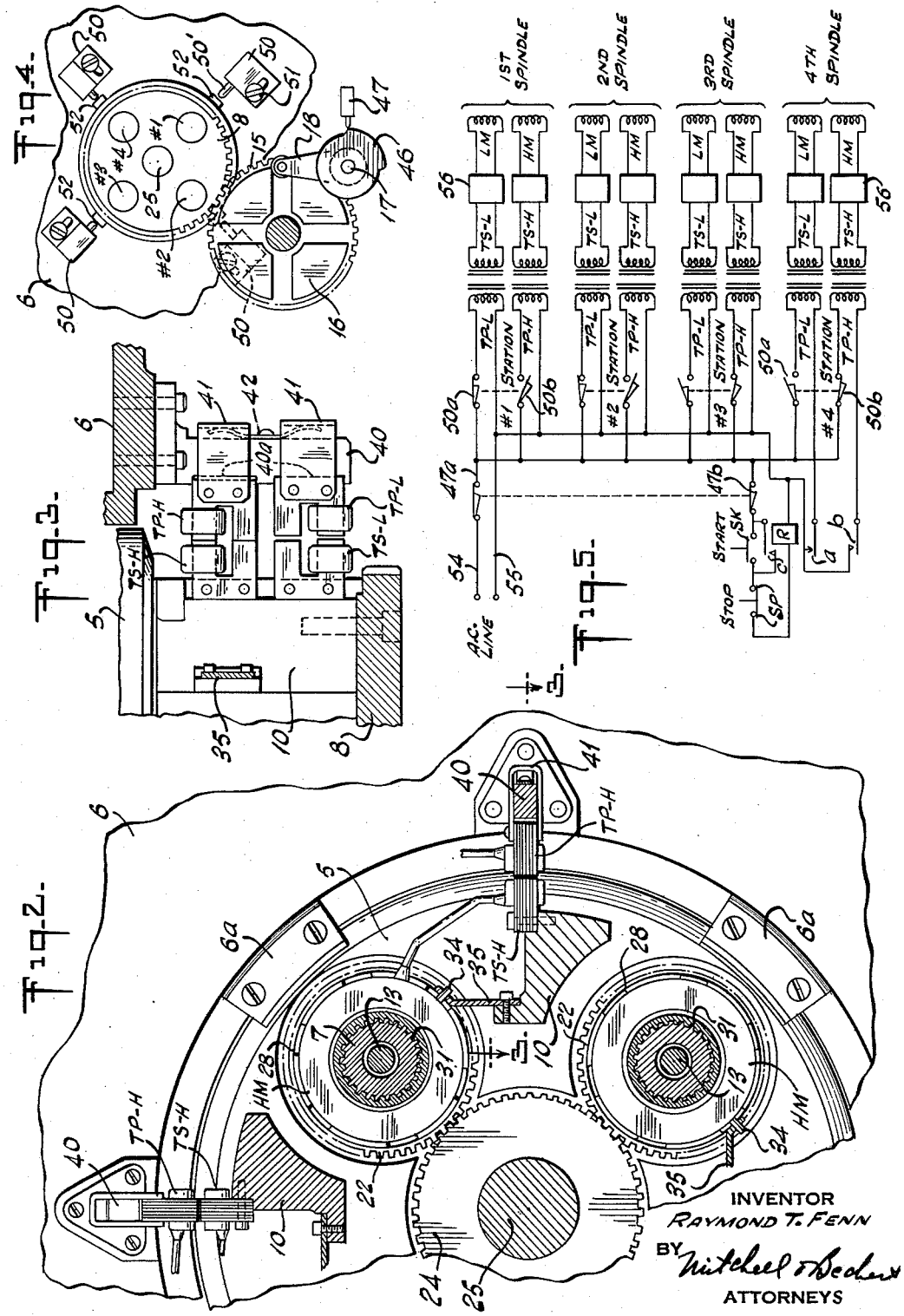

United States Patent Office 3,063,131
Patented Nov. 13, 1962

3,063,131
INDEXING MACHINE TOOL
Raymond T. Fenn, Pleasant Valley, Conn., assignor to The New Britain Machine Company, New Britain, Conn., a corporation of Connecticut
Filed Aug. 6, 1959, Ser. No. 832,076
10 Claims. (Cl. 29—64)

This invention concerns metal working machines or the like and particularly indexible multiple spindle machines.

The invention provides improved means for operating a spindle or spindles on an indexible spindle carrier.

The invention presents a novel arrangement for applying electrical power to one or more electrical devices on an indexible carrier.

The invention provides a unique arrangement to program operation of elements on an indexible carrier.

The subject machine involves a plurality of spindles on an indexible spindle carrier, indexing of which steps the spindles to respectively next positions or stations of a series of operating or spindle stations. Each spindle is rotatably driven through clutch means. Either a high or a low speed drive or neither may be clutched to the spindle, depending on the desired mode of operation of the spindle. The selective clutch means for each spindle includes electrical or magnetic clutch devices.

The invention provides a novel arrangement for operating the electrical devices on the indexible carrier in each indexed position of the devices. One aspect of the arrangement involves application of current to the devices in a unique manner having advantages including that of avoiding any possible hindrance to indexing movement of the carrier. Another aspect involves the programming of the operations of the electrical devices in accordance with their station settings.

According to the invention, an improved arrangement is used to apply electrical power to one or more magnetic spindle-driving clutches on an indexible spindle carrier. The invention provides for the inductive transfer of electrical energy from frame-based to carrier-based electrical means. More specifically, the arrangement involves use of split transformers of which primary sections are frame-based and secondary sections carrier-based to come into complementary, paired transformer relationship in each indexed position of the carrier. Provision is made for allowing paired primary and secondary sections of a transformer to move into sealed contiguity during transformers activity and to retract from each other in order to afford clearance during indexing movement of the carrier.

According to the invention, operations of a spindle or spindles on an indexible carrier will be programmed in accordance with the station settings of the spindle or spindles. The programming system will involve preselection of operations in relation to the stations and each spindle, upon arriving at a station, will operate in accordance with the preeselected program for the station.

The invention provides a system which permits programming of selectable speeds for the spindles on an indexible carrier in the various spindle positions to which the spindles are brought by the indexing of the carrier.

The invention provides for the changing of spindle speeds through the use of split transformers and electric clutches.

Other objects of the invention will appear from the following parts of the specification and from the drawings showing by way of example a preferred embodiment of the invention.

FIG. 1 is a sectional view through a portion of a multiple spindle machine and shows one of the work spindles.

FIG. 2 is a fragmentary sectional view on line 2—2 of FIG. 1.

FIG. 3 is a fragmentary sectional view taken along the broken line 3—3 of FIG. 2.

FIG. 4 is a rear end view showing the spindle carrier indexing mechanism and spindle operation programming switches.

FIG. 5 is a circuit diagram of the electrical system involved in the invention.

The invention is shown in connection with a multiple spindle machine having a rotary carrier 5 mounted for indexing movement in a frame member 6 and retained on the frame member with the aid of thrust pieces 6a. Rotatably supported by the carrier are a plurality of work spindles 7. In the shown example, there are four spindles 90 degrees apart in a circle around the carrier axis. At the rear, the spindle is journaled in a carrier index gear 8 by means of an antifriction bearing 9 (FIG. 1). Fixed onto the rear of the spindle is a cylinder 11 with a fluid actuated piston 12 which through a draw bar arrangement 13 operates the work holding chuck (not shown) of the spindle. FIG. 1 shows a portion of the carrier stem 14 which extends through the work zone of the machine and is rotatably supported in the front wall of the not shown power case of the machine. The carrier index gear 8 meshes with a same size index gear 15 on an index wheel 16 provided with four Geneva slots one for each of the operating or spindle stations #1, #2, #3 and #4 (see FIG. 4). Fixed to main cam shaft 17 of the machine is a Geneva drive arm 18. Within each cycle of revolution of shaft 17, arm 18 engages a Geneva slot of wheel 16 to index the wheel and therefore the spindle carrier 5 through a one quarter turn. At each such indexing step, the spindles 7 move to their respectively next work operating stations. In a full carrier turn, each spindle tours the successive stations and ends up at its initial station setting.

Each spindle 7 is clutch driven at high or low speed. The two-speed drive arrangement resembles that shown in Retz Patent 2,682,327 but differs in being equipped for purposes of the invention with electrical clutch means, specifically clutch magnets LM and HM (FIG. 1). The magnets LM and HM are respectively elements of low and high speed clutches generally designated L and H. Clutches L and H are twins except for the sizes of their respective drive gears 21 and 22, and corresponding elements of the clutches may be given the same reference designations. Gears 21 and 22 are rotatably mounted on the spindle and respectively mesh with gears 23 and 24 on a drive input shaft 25 coaxial with spindle carrier 5. Integral with the gears 21 and 22 are axially extending notched ring members 28 (also see FIG. 2). Each member is spaced around a driven clutch hub 30 splined at 31 to the spindle. Between ring members 28 and the hub 30 is a stack of alternately arranged friction clutch disks 32 and 33 respectively keyed to the ring member and the hub. Magnets LM and HM are freely mounted on the spindle in the space between the clutch hubs 30 of the respective clutches. To prevent rotation of the magnets with the spindle, pins 34 extend from the magnets into slots in a bracket 35 fixed to a carrier leg 10. Upon energization of magnet LM, it attracts its armature 36L to clamp its stack of disks 32 and 33 against a pressure disk 37, thus coupling the spindle to the low speed drive gear 21. Similarly, energization of magnet HM will attract its armature disk 36H for clamping the adjacent set of disks 32—33 against their pressure plate 37, thus clutching the spindle to high speed drive gear 22. The armature disks 36L and 36H and the pressure disks 37 are keyed to their clutch hubs 30. Each disk 37 consists of two concentric iron rings separated by suitable nonmagnetic bonding material. Disks 32 and 33 are nonmagnetic to permit flow of magnetic flux lines between the magnets and their armatures.

The invention features improved means to supply electric power from an outside source to the clutch magnets in the various settings to which the clutch magnets are indexed along with their mounting spindles. The means provided by the invention involves the use of inductively coupled frame-based and carrier-based electrical agencies. Specifically, the preferred induction means comprises split transformers of which the primary halves are frame-based and the secondary halves are carrier-based. There is one split transformer for each of the clutch magnets. Since the disclosed machine has four pairs of clutch magnets LM and HM, one pair on each spindle 7, four corresponding pairs of split transformers are provided. The primaries of the transformers are designated TP–L and TP–H according to whether they are used in connection with the low or high speed clutches. Similarly, the transformer secondaries relating to the low and high speed clutches are respectively designated TS–L and TS–H. As shown in FIG. 3, the pair of secondaries TS–L and TS–H for the electric clutches of a spindle are fixed side by side on an adjacent carrier leg 10 (also see FIG. 2). In each indexed position of the spindle carrier 5, the pairs of secondaries are in complementary facing relation with the pairs of primaries, one pair of primaries being provided for each work station. When the carrier is indexed, the spindles advance to their respective next work stations and the transformer secondaries likewise advance into complementary relation with their respective next transformer primaries.

The pair of transformer primaries TP–L and TP–H for each work station are mounted side by side on a frame bar 40 in a manner permitting limited radial play of the primaries. The frame bar passes through U straps 41 attached to the laminated primary cores. At their rear, these cores fit without side play in shallow recesses 40a formed in the front of the frame bar 40. The cores are bottomed in the recesses by springs 42, so that the primaries are normally in outward or rear positions and separated by a radial clearance distance from the path of the secondaries. When a primary is energized, it is magnetically attracted to the facing secondary and the two transformer halves seal together into maximum current transmission relation. The sealed status is shown in FIG. 3 for the facing transformer halves TP–H and TS–H. Just prior to carrier indexing at completion of a work cycle, a cam 46 on main cam shaft 17 (FIG. 4) cams a normally closed line switch 47 (also see FIG. 5) into open position. This removes power from all the transformers; hence, primaries in sealed status during the work cycle are restored by their springs 42 to rear position so as to provide open clearance for carrier indexing movement.

The invention provides an improved system for programming spindle operations at the various stations. The spindles will be programmed for low or high speed rotation in accordance with their station settings. Selection of spindle speed at a station will be effected through selective energization of one or the other of the pair of transfer primaries TP–L and TP–H at the station. The selecting or programming means includes switch units 50, one for each station, adjustably mounted to frame 6 in a circular array about the spindle carrier 5. Suitable adjustable mounting is provided for a switch unit by a clamp screw 51 passing through an elongated slot in the switch container and threaded into the frame. A switch unit may be set alternatively in inner or outer position to locate the switch button 50' in or out of the path of switch actuator dogs 52 on the spindle carrier. There is one dog 52 to each spindle and the dogs are spaced commensurately with the spindle spacing. Hence, when a spindle is indexed to a particular work station, the dog 52 related to the spindle is brought under the button 50' of the switch unit 50 at that station. If the switch unit is in inner position, then the dog as it comes under the switch button reverses or transfers the normal condition of a pair of contacts 50a and 50b in the switch unit (see FIG. 5). If the switch unit has been set in outer position, the button 50' is out of the way of the dog and the switch contacts retain their normal condition. As will be brought out in the description of the circuit, with the switch unit at a station set in outer position where its contacts remain in normal condition, the switch unit selects low spindle speed for each spindle indexed to this station. On the other hand, with the switch unit set in the inner position where its contacts will be reversed by each dog 52, the switch unit selects the high speed operation for each spindle indexed to the station. In the example shown in FIG. 4, the switch units are set for a program of low speed spindle operations at stations #1 and #2, and high speed spindle operations at stations #3 and #4. At stations #1, #2 and #3, the program is automatically applied to the spindles. Station #4 is used for work loading and unloading and the program at that station is not applied to a spindle until a start key (FIG. 5) is depressed.

In further explanation of program switch units 50, the switches 50a and 50b in each unit are normally in closed and open conditions, respectively. While a dog 52 on the carrier 5 is pressing on a switch button 50' of a unit, it reverses the normal conditions of the contacts in the unit, opening 50a and closing 50b. The showing in FIG. 5 of the contacts 50a and b at the several work stations is consistent with the program indicated in FIG. 4. To aid in explanation of the circuit, the spindles may be referred to as the 1st, 2nd, 3rd and 4th spindles. It is assumed in FIG. 5 that the 1st to 4th spindles have been indexed respectively to the #1 to #4 work stations. Hence the transformer secondaries of the 1st to 4th spindles are now in transformer coaction respectively with the transformer primaries of the #1 to #4 stations. Assuming that the indexing step has just been completed and therefore that the button of switch unit 47 (FIG. 4) has just ridden off the lobe of cam 46, contacts 47a and 47b of this switch unit are in their normally closed condition indicated in FIG. 5. Under the given conditions, primaries TP–L of stations #1 and #2 and TP–H of station #3 are being energized from the A.C. line. The circuit of TP–L of station #1 is made for instance from line side 54 via 47a and thence via 50a of the #1 station through its primary TP–L to line side 55. With TP–L of station #1 energized, it generates current through the now-facing secondary TS–L of the 1st spindle. The current output of TS–L is rectified by a suitable rectifier 56, which may be a selenium rectifier, and fed to clutch magnet LM of the 1st spindle. Energization of this clutch magnet clutches the 1st spindle to the low speed drive, as preselected by the program for the #1 station. Similarly, magnet LM of the 2nd spindle and magnet HM of the 3rd spindle are energized by power applied through split transformers and the 2nd and 3rd spindles are clutched in for low and high speed rotation, respectively. Neither clutch magnet at station #4 operates as yet because the circuits of the primaries at that station are open at contacts $a$ and $b$ of start relay R. Thus the spindle at station #4 stops, permitting unloading and loading of work pieces. When a new piece has been chucked to the spindle at station #4, the operator presses the start key to close key contacts SK, completing a circuit from line side 54 via 47a and b, SK, stop key contacts SP, relay R to opposite line side 55. Relay R closes its contacts $c$ to shunt the start key contacts SK and also closes relay contacts $a$ and $b$. With 50b at station #4 closed, the circuit of TP–H at the station is now complete and current is transferred to the now facing TS–H of the 4th spindle, so that HM of this spindle operates to clutch the spindle in for high speed rotation. The dwell time of the carrier between steps of advance will ordinarily be long enough to afford ample time for unloading and loading of workpieces at station #4. It is understood, however, that for safety sake, well known means will be provided to enable the operator to hold indexing shaft 17 out of action until after unloading and loading have been completed.

At the start of the next carrier indexing step, cam 46 operates switch 47 to open contacts 47a and 47b. As a result, the hold circuit of relay R is broken and also the circuits of all the transformer primaries are broken. Hence the spindles are declutched while the indexing movement of the carrier takes place. The indexing time is very short and there is sufficient inertia in the rotating mass of the spindle assemblies to retain rotation through the indexing time so that the spindles (except for the one stepped to station #4) are easily picked up in their new station settings, it being understood that certain spindle speeds will increase while others will decrease, depending on the work cycle program.

While I have shown and described certain elements, the primaries, of the split transformers as being movable to provide indexing clearance, it is understood that said elements may be fixed to the frame with sufficient indexing clearance between them and their carrier based counterparts and still be effective to transmit the necessary power to these counterparts. Also, while I have shown and described a system which includes magnetic clutches for a multi-speed spindle, it is understood that the system may be modified to provide a single clutch and brake system that is subject to selective programming in order that cross drilling, milling or other operations requiring a temporarily stationary spindle may be carried out. It is understood further that other variations and modifications may be made without departing from the invention. It is therefore intended to be limited only as indicated by the scope of the following claims.

I claim:

1. In a metal working machine or the like having an indexible carrier, a spindle supported by said carrier for indexing to each of successive work stations in turn, and mechanism for indexing the carrier in successive steps to determine the work station setting of the spindle, said mechanism including electrical means for selectively pre-selecting spindle operations according to the work station.

2. In a machine of the character indicated having an indexible carrier, a spindle thereon, mechanism for indexing the carrier to advance the spindle from one station to a next of successive work stations, drive means for the spindle including an electric clutch on the carrier, and means for programming clutch operation at the work stations, said programming means including program switch means related to the different stations and means movable in step with the advance of the spindle from station to station for coacting with the switch means to control application of the program at the different stations to the electric clutch.

3. In a metal working machine or the like having an indexible carrier, a spindle rotatably supported by the carrier, mechanism for indexing the carrier to advance the spindle from one station to a next of successive work stations, variable speed drive means for the spindle, and means for programming spindle speed at the work stations, said programming means including program switch means related to the different stations and electrical circuits controlled thereby according to the station settings of the spindle for selectively operating the variable speed drive means.

4. In a machine of the character indicated having a frame, a carrier rotatively mounted for indexing movement relative to the frame, a spindle on the carrier, an electrical means on the carrier for controlling spindle effectivity, and means for applying electrical energy to said electrical means, said energy applying means, including inductively coupled frame-based flux transmitting means and carrier-based flux receiving means.

5. In a machine of the character indicated having a frame, a carrier rotatively mounted in the frame for indexing movement, a spindle on the carrier, an electrical means on the carrier for controlling spindle effectivity, and means for applying electrical power to said electrical means, said power applying means, including a split transformer with a frame-based primary and a carrier-based secondary coming into complementary transformer relationship during a cycle of the carrier.

6. In a machine of the character indicated having a frame, a carrier rotatively indexible in the frame, a spindle on the carrier, an electric device on the carrier for controlling spindle effectivity, and means for applying power to said device, said power applying means, including a split transformer with a frame-based primary section and carrier-based secondary section coming into facing coacting relation during a carrier cycle, and means for so mounting one of the transformer sections as to enable it to move radially of the carrier into sealed coupled contiguity with the facing transformer section from a normally radially distant position in which indexing clearance exists between the transformer sections.

7. In a machine of the character indicated having a frame, a carrier rotatively indexible in the frame, an electrically operable means mounted on the carrier, mechanism for indexing the carrier from one position to a next in a cycle of such positions, and means for applying electrical power to said electrically operable means in the various indexed positions of the carrier, said power applying means including a split transformer arrangement comprising a plurality of frame-based primaries, one for each indexed position of the carrier, and a carrier-based transformer secondary brought into coaction with one after another of the frame-based primaries as the carrier is indexed from one position to the next.

8. In a machine of the character indicated having a frame, a carrier rotatively indexible in the frame, a plurality of electrical means mounted on the carrier, mechanism for indexing the carrier relative to an operating station, and means for selectively applying power to said electrical means, said power applying means, including a frame-based transformer primary and a plurality of carrier-based transformer secondaries, one associated with each of said electrical means for successively coming into complementary transformer-coupled relation with the frame-based transformer primary as the carrier is indexed relative to the operating station.

9. In a machine of the character indicated having a frame, a rotary carrier indexible in the frame, a spindle rotatively mounted on the carrier, mechanism for indexing the carrier to step the station from one station to a next of a series of stations, means for rotating the spindle including an electric clutch accompanying the spindle from one station to a next, and means for supplying electrical power to the clutch, said power supplying means including a split transformer arrangement comprising frame-based transformer primaries one to each station and a carrier-based transformer secondary brought into complementary relation with one after another of the primaries as the spindle is stepped from one station to the next.

10. In a machine of the character indicated having a frame, a rotary carrier indexible in the frame, a spindle rotatively mounted on the carrier, and mechanism for indexing the carrier to step the spindle from one station to the next of a series of work stations, said indexing mechanism comprising alternatively clutchable low and high speed drive means for the spindle, clutch magnets one for operating the high speed clutchable drive means and the other for operating the low speed clutchable drive means, means including split transformer arrangements through which electrical power is applied selectively to one or the other clutch magnets, said transformer arrangements including a pair of frame-based primaries for each station and a pair of carrier-based secondaries respectively having their outputs connected to the low and high speed clutch magnets, the pair of secondaries being brought successively into complementary relation with the pairs of primaries for the successive stations as the spindle is stepped to these stations, and means for selectively energizing one or the other of the primaries in a station pair while in complementary relation with the pair of secondaries, so as to select one or the other clutch magnet for operation, depending on whether the spindle is to run at low or high speed while at that station.

References Cited in the file of this patent

UNITED STATES PATENTS

| | | |
|---|---|---|
| 962,000 | Blancke | June 21, 1910 |
| 2,466,574 | Bullard | Apr. 5, 1949 |
| 2,540,186 | Bullard | Feb. 6, 1951 |